United States Patent
Lee et al.

(10) Patent No.: US 10,081,240 B2
(45) Date of Patent: Sep. 25, 2018

(54) POWER TRANSMISSION APPARATUS OF A HYBRID ELECTRIC VEHICLE

(71) Applicant: HYUNDAI MOTOR COMPANY, Seoul (KR)

(72) Inventors: Kyeong Hun Lee, Seoul (KR); Jong Soo Kim, Seoul (KR); Jong Sool Park, Hwaseong-si (KR); Dong Hwan Hwang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 141 days.

(21) Appl. No.: 15/371,530

(22) Filed: Dec. 7, 2016

(65) Prior Publication Data

US 2018/0111471 A1    Apr. 26, 2018

(30) Foreign Application Priority Data

Oct. 21, 2016   (KR) .................. 10-2016-0137790

(51) Int. Cl.

| | |
|---|---|
| *B60K 6/54* | (2007.10) |
| *B60K 6/365* | (2007.10) |
| *B60K 6/48* | (2007.10) |
| *F16H 3/72* | (2006.01) |
| *F16H 37/04* | (2006.01) |
| *F16H 37/06* | (2006.01) |
| *B60K 6/543* | (2007.10) |
| *F16H 3/00* | (2006.01) |
| *F16H 3/085* | (2006.01) |

(52) U.S. Cl.
CPC ............. *B60K 6/543* (2013.01); *B60K 6/365* (2013.01); *B60K 6/48* (2013.01); *F16H 3/006* (2013.01); *F16H 3/085* (2013.01); *F16H 3/725* (2013.01); *F16H 37/042* (2013.01); *F16H 37/065* (2013.01); *B60K 2006/4825* (2013.01); *B60Y 2200/92* (2013.01); *B60Y 2400/72* (2013.01); *B60Y 2400/73* (2013.01); *F16H 2200/0021* (2013.01); *F16H 2200/0039* (2013.01); *F16H 2200/2005* (2013.01); *Y10S 903/91* (2013.01); *Y10S 903/918* (2013.01)

(58) Field of Classification Search
CPC .......... B60K 6/365; B60K 6/543; B60K 6/48; B60K 2006/4825; F16H 3/725; F16H 37/042; F16H 37/065; F16H 2200/2005
See application file for complete search history.

(56) References Cited

U.S. PATENT DOCUMENTS

| | | | |
|---|---|---|---|
| 6,645,105 B2 * | 11/2003 | Kima .................. | B60K 6/365 475/5 |
| 8,187,130 B1 | 5/2012 | Mellet et al. | |
| | | (Continued) | |

FOREIGN PATENT DOCUMENTS

KR   10-2016-0072697 A   6/2016

*Primary Examiner* — Ramya P Burgess
*Assistant Examiner* — David R Morris
(74) *Attorney, Agent, or Firm* — McDonnell Boehnen Hulbert & Berghoff LLP (57) ABSTRACT

A power transmission apparatus for a hybrid electric vehicle includes an input unit having three input shafts disposed with several input gears, a torque converting unit including a planetary gear set having rotational elements connected with the input shafts, and a shifting output unit for shifting torques received from the input shafts and outputting the shifted torque.

15 Claims, 3 Drawing Sheets

(56) References Cited

U.S. PATENT DOCUMENTS

| | | | | |
|---|---|---|---|---|
| 8,517,876 B2* | 8/2013 | Sakai | B60K 6/387 | 475/5 |
| 8,632,438 B2* | 1/2014 | Kuroda | B60K 6/48 | 477/5 |
| 8,672,804 B2* | 3/2014 | Okubo | B60K 6/387 | 477/5 |
| 8,747,265 B2* | 6/2014 | Onomura | B60K 6/383 | 475/343 |
| 8,790,202 B2* | 7/2014 | Sakai | B60K 6/365 | 475/5 |
| 8,827,852 B2* | 9/2014 | Ikegami | B60K 6/36 | 475/5 |
| 8,892,287 B2* | 11/2014 | Takeuchi | B60K 6/36 | 180/65.265 |
| 8,948,945 B2* | 2/2015 | Tsuneishi | B60K 6/547 | 180/65.265 |
| 8,983,702 B2* | 3/2015 | Ikegami | B60L 11/1861 | 180/65.265 |
| 9,002,553 B2* | 4/2015 | Kamoshida | B60K 6/36 | 180/65.28 |
| 9,073,546 B2* | 7/2015 | Kuroda | B60K 6/48 | |
| 9,180,872 B2* | 11/2015 | Lee | B60W 20/40 | |
| 9,221,329 B2* | 12/2015 | Kuroda | B60K 6/48 | |
| 9,346,462 B2* | 5/2016 | Park | B60K 6/48 | |
| 9,409,473 B2* | 8/2016 | Kaltenbach | B60K 6/387 | |
| 9,555,699 B2* | 1/2017 | Huh | B60K 6/36 | |
| 9,573,456 B2* | 2/2017 | Lee | B60K 6/365 | |
| 9,580,069 B2* | 2/2017 | Nakanishi | B60W 50/082 | |
| 9,586,470 B2* | 3/2017 | Park | B60W 20/30 | |
| 9,676,265 B2* | 6/2017 | Choi | B60K 6/365 | |
| 9,682,614 B2* | 6/2017 | Lee | B60K 6/36 | |
| 9,744,840 B2* | 8/2017 | Lee | B60K 6/48 | |
| 9,827,981 B2* | 11/2017 | Takeuchi | B60W 20/40 | |
| 2003/0045389 A1* | 3/2003 | Kima | B60K 6/365 | 475/5 |
| 2012/0021861 A1* | 1/2012 | Sakai | B60K 6/365 | 475/5 |
| 2012/0053011 A1* | 3/2012 | Onomura | B60K 6/383 | 477/3 |
| 2012/0115674 A1* | 5/2012 | Ikegami | B60K 6/36 | 477/3 |
| 2012/0115677 A1* | 5/2012 | Sakai | B60K 6/387 | 477/5 |
| 2012/0116629 A1* | 5/2012 | Kamoshida | B60K 6/36 | 701/22 |
| 2012/0259496 A1* | 10/2012 | Ikegami | B60K 6/365 | 701/22 |
| 2012/0303201 A1* | 11/2012 | Tsuneishi | B60K 6/547 | 701/22 |
| 2012/0310462 A1* | 12/2012 | Kuroda | B60K 6/48 | 701/22 |
| 2012/0322603 A1* | 12/2012 | Kuroda | B60K 6/48 | 475/5 |
| 2013/0045833 A1* | 2/2013 | Okubo | B60K 6/387 | 477/5 |
| 2013/0096761 A1* | 4/2013 | Kuroda | B60K 6/48 | 701/22 |
| 2013/0103242 A1* | 4/2013 | Takeuchi | B60K 6/36 | 701/22 |
| 2013/0109530 A1* | 5/2013 | Kaltenbach | B60K 6/387 | 477/5 |
| 2013/0325237 A1* | 12/2013 | Ikegami | B60L 11/1861 | 701/22 |
| 2013/0337972 A1* | 12/2013 | Lee | B60W 20/40 | 477/5 |
| 2015/0165888 A1* | 6/2015 | Lee | B60K 6/48 | 475/5 |
| 2015/0321545 A1* | 11/2015 | Park | B60W 20/30 | 475/5 |
| 2015/0321662 A1* | 11/2015 | Park | B60K 6/48 | 475/5 |
| 2016/0052381 A1 | 2/2016 | Kaltenbach et al. | | |
| 2016/0052511 A1* | 2/2016 | Takeuchi | F02N 5/04 | 701/22 |
| 2016/0102742 A1* | 4/2016 | Lee | B60K 6/36 | 475/5 |
| 2016/0167502 A1* | 6/2016 | Choi | B60K 6/365 | 475/5 |
| 2016/0167503 A1* | 6/2016 | Lee | B60K 6/365 | 475/5 |

* cited by examiner

| Shift-stage | ECL | CL1 | CL2 | CL3 | SL1 1st | SL1 3rd | Remark |
|---|---|---|---|---|---|---|---|
| Engine-starting | ● | ● | | | | | |
| Neutral | ● | | | | ● | | |
| Neutral battery charging | ● | | ● | | ● | | |
| Fixed gear ratio mode 1 | ● | ● | ● | | ● | | Engine-driven, motor-assisted |
| Fixed gear ratio mode 2 | ● | ● | | ● | | | Engine-driven, motor-assisted |
| Fixed gear ratio mode 3 | ● | ● | ● | | | ● | Engine-driven, motor-assisted |
| Variable gear ratio mode 1 | ● | | ● | | ● | | Engine-driven, motor-driven |
| Variable gear ratio mode 2 | ● | | ● | ● | | | Engine-driven, motor-driven |
| EV mode 1 | | ● | ● | | ● | | motor-driven |
| EV mode 2 | | ● | | ● | ● | | motor-driven |
| EV mode 3 | | ● | ● | | | ● | motor-driven |
| EV mode R | | ● | ● | | ● | | motor-driven(reverse) |

FIG. 3

POWER TRANSMISSION APPARATUS OF A HYBRID ELECTRIC VEHICLE

CROSS-REFERENCE TO RELATED APPLICATION

This application claims priority to and the benefit of Korean Patent Application No. 10-2016-0137790 filed in the Korean Intellectual Property Office on Oct. 21, 2016, the entire contents of which are incorporated herein by reference.

BACKGROUND (a) Field

The present disclosure relates to a power transmission apparatus for a hybrid electric vehicle.

(b) Description of the Related Art

Environmentally-friendly vehicle technology is an example of the core technology that controls the future of the automobile industry, and advanced car makers have focused their energy on the development of an environmentally-friendly vehicle to meet environmental and fuel efficiency regulations.

In particular, car makers have developed an electric vehicle ("EV"), a hybrid electric vehicle ("HEV"), a fuel cell electric vehicle ("FCEV"), and the like, as future vehicle technologies.

Because such vehicles have various technological restrictions such as a weight and cost, the vehicle makers have turned to the hybrid electric vehicle as a way to meet exhaust gas regulations and improve fuel efficiency performance, and have entered into keen competition for commercializing the hybrid electric vehicle.

The hybrid electric vehicle is a vehicle using two or more power sources. The power sources may be combined by various methods. For instance, the power sources may include a motor/generator driven by electric energy and may also include a fossil fuel engine, such as either a gasoline engine or a diesel engine.

The hybrid electric vehicle generally uses, as a primary power source, both (i) a motor/generator having a relatively excellent torque at low speeds and (ii) an engine having a relatively excellent torque at high speeds.

At low speeds, the hybrid electric vehicle's operation of the fossil fuel engine stops, and the motor/generator is used instead. As a result, the hybrid electric vehicle can provide high fuel efficiency and a reduction of exhaust gas.

A double clutch transmission ("DCT") is an example of a transmission useful in a hybrid electric vehicle. A DCT includes two clutches applied to a manual transmission scheme, and thereby enhances efficiency and convenience.

The DCT uses two separate clutches for odd-numbered shift-stages and even-numbered shift-stages, and thereby improves continuity in torque transmission by alternatingly operating these two clutches.

However, in some scenarios when starting a vehicle, such as starting a vehicle on a slanted surface (which can cause a rearward slip of the vehicle), use of the DCT results in a relatively high degree of clutch wear and energy loss. In addition, the DCT typically is controlled with a short shift-control period due to low heat capacity, which can easily cause shift shock to occur.

In addition, in order to use a DCT in a hybrid electric vehicle, an appropriate arrangement of a motor/generator as a power source must be devised.

The above information disclosed in this Background section is only for enhancement of understanding of the background of the present disclosure and therefore it may contain information that does not form the prior art that is already known in this country to a person of ordinary skill in the art.

SUMMARY

The present disclosure provide, for a hybrid electric vehicle, a power transmission apparatus having the following advantages: smooth starting and shifting of the vehicle, improved fuel consumption, and improved acceleration performance.

An example embodiment includes a power transmission apparatus of a hybrid electric vehicle having an engine and a motor/generator as power sources. The power transmission apparatus may include an input unit, a torque converting unit, and a shifting output unit. The input unit may include a first input shaft selectively connected with the engine and the motor/generator and fixedly disposed with one input gear; a second input shaft selectively connected with the motor/generator; and a third input shaft fixedly disposed with at least one input gear. The torque converting unit may include a planetary gear set having a first rotational element connected with the second input shaft, a second rotational element connected with the third input shaft, and a third rotational element connected with the first input shaft. The shifting output unit may shift torques received from the first and third input shafts and output a shifted torque.

The second and third input shafts of the input unit may be formed as a hollow shaft, and the first, second, and third input shafts may be coaxially disposed in a radial direction in an order of the first, second, and third input shafts.

The torque converting unit may be disposed at a downstream portion of the first, second, and third input shafts.

The torque converting unit may be a single pinion planetary gear set having a sun gear as the first rotational element, a planet carrier as the second rotational element, and a ring gear as the third rotational element.

The shifting output unit may include first and second shifting output devices. The first shifting output device may include a first output shaft disposed in parallel with the first input shaft, two shifting gears rotatably disposed on the first output shaft and externally engaged with two input gear fixedly formed on the third input shaft, and a first output gear fixedly disposed at an upstream portion of the first output shaft. The second shifting output device may include a second output shaft disposed in parallel with the first input shaft, an idle shaft rotatably disposed on the second output shaft, one shifting gear fixedly disposed on the idle shaft, selectively connected with the second output shaft, and externally engaged with the one input gear fixedly disposed on the first input shaft, and a second output gear fixedly disposed at an upstream portion of the second output shaft.

The at least one input gear fixedly disposed on the third input shaft may include a first input gear acting as an input gear for the forward first speed and a second input gear acting as an input gear for the forward third speed. The one input gear fixedly disposed on the first input shaft may be a third input gear acting as an input gear for the forward second speed.

A power transmission apparatus of a hybrid electric vehicle according to an example embodiment of the present disclosure shows an effective improvement in fuel consumption by providing for three shift-stages in a fixed gear ratio mode by using the engine as a primary power source and the motor/generator as an auxiliary power source, two shift-stages in a variable gear ratio mode enabling electronic continuously variable shifting by using the engine and the motor/generator as power sources, and three shift-stages by only using the motor/generator as a power source.

In particular, driving efficiency may be enhanced by operating a power transmission apparatus in the variable gear ratio mode for city driving, and in the fixed gear ratio mode for high speed driving.

In addition, smooth starting of a vehicle may be achieved by having the engine and the motor/generator connected with respective rotational elements of the planetary gear set.

When the motor/generator fails, a vehicle still may be driven by the torque of the engine.

In the fixed gear ratio mode, the torque of the motor/generator may be used as an auxiliary power source, thereby improving acceleration performance.

The reverse driving speed may be achieved by reversing the motor/generator.

Further, effects that can be obtained or expected from example embodiments of the present disclosure are directly or suggestively described in the following detailed description. That is, various effects expected from example embodiments of the present disclosure will be described in the following detailed description.

DETAILED DESCRIPTION OF THE EMBODIMENTS

The present disclosure will be described more fully hereinafter with reference to the accompanying drawings, in which example embodiments of the disclosure are shown.

The drawings and description are to be regarded as illustrative in nature and not restrictive, and like reference numerals designate like elements throughout the specification.

In this detailed description, a "front" or "upstream" of the transmission is referred to as a side proximal to the engine, and a "rear" or "downstream" of the transmission is referred to as a side distal to the engine.

In the following description, names of components may be divided into first, second, and the like to distinguish parts having the same name but which need not necessarily occur in a particular order.

1. First Example Power Transmission Apparatus

Figure 1:
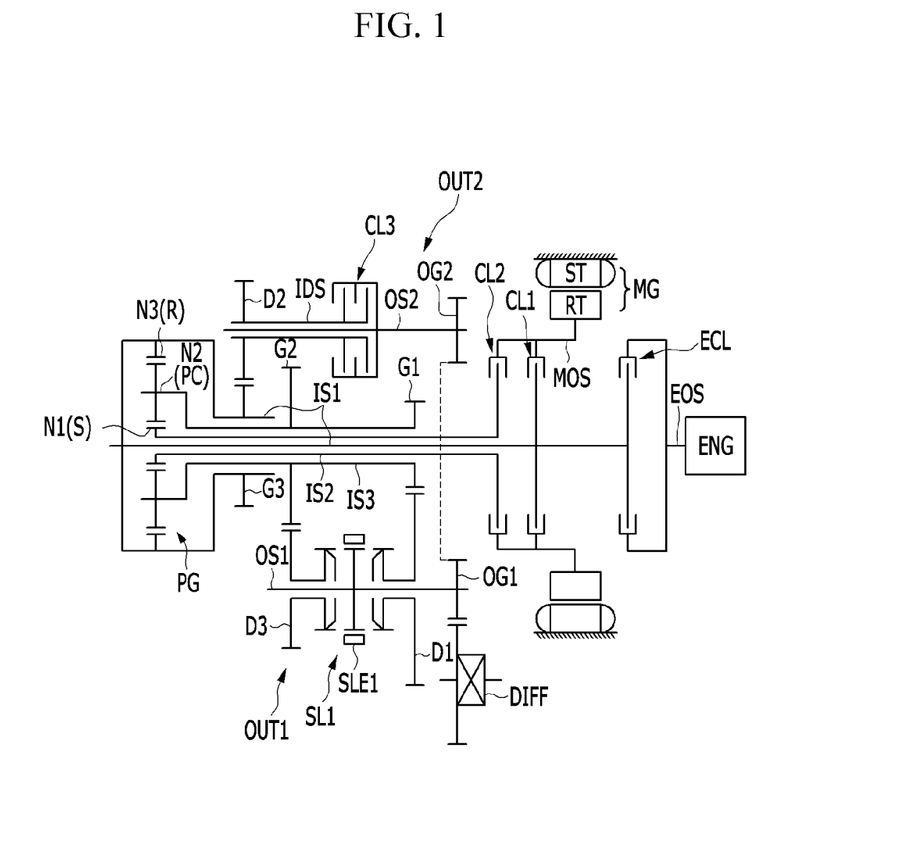
FIG. 1 is a schematic diagram of a power transmission apparatus of a hybrid electric vehicle according to a first example embodiment.

FIG. 1 is a schematic diagram of a power transmission apparatus of a hybrid electric vehicle according to an example embodiment.

Referring to FIG. 1, a power transmission apparatus of a hybrid electric vehicle utilizes an engine ENG and a motor/generator MG as power sources, and includes an input unit, a torque converting unit, and a shifting output unit.

The engine ENG is a primary power source, and may be a gasoline engine or a diesel engine.

The motor/generator MG is an electric supplementary drive unit ("ESDU"), and functions as a motor that generates a driving torque and also as a generator that generates electric energy producing a mechanical reactive force. The motor/generator MG includes a stator ST fixed to a transmission housing H and a rotor RT rotatable inside the stator, where the rotor RT is directly connected with a motor output shaft MOS.

The input unit includes first, second, and third input shafts IS1, IS2, and IS3.

The first input shaft IS1 is formed as a solid shaft and disposed on the same axis as an engine output shaft EOS. An upstream portion of the first input shaft IS1 is selectively connected with the engine output shaft EOS and the motor output shaft MOS respectively.

The second input shaft IS2 is formed as a hollow shaft, and rotatably and coaxially disposed at an external circumference of the first input shaft IS1. An upstream portion of the second input shaft IS2 is selectively connected with the motor output shaft MOS.

The third input shaft IS3 is formed as a hollow shaft, and rotatably and coaxially disposed at an external circumference of the second input shaft IS2.

First and second input gears G1 and G2 are fixedly disposed on the third input shaft IS3, and a third input gear G3 is fixedly disposed on the first input shaft IS1.

The first, second, and third input gears G1, G2, and G3 act as input gears for respective shift-stages, where the first input gear G1 acts as an input gear for realizing the forward first speed, the second input gear G2 as an input gear for realizing the forward third speed, and the third input gear G3 as an input gear for realizing the forward second speed.

A clutch unit including an engine clutch ECL and first and second clutches CL1 and CL2 is disposed between first and second input shafts IS1 and IS2 and the power sources of the engine ENG and the motor/generator MG.

The engine clutch ECL is disposed between the engine output shaft EOS and the first input shaft IS1, and selectively transmits torque from the engine ENG to the first input shaft IS1.

The first clutch CL1 is disposed between the motor output shaft MOS and the first input shaft IS1, and selectively transmits torque from the motor/generator MG to the first input shaft IS1.

The second clutch CL2 is disposed between the motor output shaft MOS and the second input shaft IS2, and selectively transmits torque from the motor/generator MG to the second input shaft IS2.

The engine clutch ECL and the first and second clutches CL1 and CL2 may comprise multi-plate hydraulic pressure friction devices that are frictionally engaged by hydraulic pressure.

The torque converting unit is formed as a planetary gear set PG that is a single pinion planetary gear set having three rotational elements.

The three rotational elements of the planetary gear set PG include first, second, and third rotational elements N1, N2, and N3, where the first rotational element N1 is a sun gear, the second rotational element N2 is a planet carrier PC that rotatably supports one or more pinion gears externally engaged with the sun gear S, and the third rotational element N3 is a ring gear R engaged with the one or more pinion gears.

The first rotational element N1 is directly connected with the second input shaft IS2, the second rotational element N2 is directly connected with the third input shaft IS3, and the third rotational element N3 is directly connected with the first input shaft IS1.

When torques of the engine ENG and the motor/generator MG are selectively transmitted to the first rotational element N1 and the third rotational element N3 through the first and second input shafts IS1 and IS2, such input torques are converted and output to the third input shaft IS3 through the second rotational element N2.

The shifting output unit includes first and second shifting output devices OUT1 and OUT2 that receive torques from the first, second, and third input gears G1, G2, and G3 on the third and first input shafts IS3 and IS1 and output shifted torques.

The first shifting output device OUT1 includes a first output shaft OS1 and forward first speed and third speed shifting gears D1 and D3. The first output shaft OS1 is disposed in parallel with the first input shaft IS1, and the forward first speed and third speed shifting gears D1 and D3 are externally engaged with the first and second input gears G1 and G2 respectively.

The forward first speed and third speed shifting gears D1 and D3 are rotatably disposed on the first output shaft OS1.

The first shifting output device OUT1 further includes a synchronizing unit, a first synchronizer SL1 in this embodiment, that is disposed on the first output shaft OS1 and selectively synchronizes the forward first speed and third speed shifting gears D1 and D3 to the first output shaft OS1.

The forward first speed shifting gear D1 is externally engaged with the first input gear G1, and the forward third speed shifting gear D3 is externally engaged with the second input gear G2.

The torque shifted at the first shifting output device OUT1 is transmitted to a differential device DIFF through a first output gear OG1 fixed to an upstream portion of the first output shaft OS1.

The first synchronizer SL1 may be formed according to known methods, and the sleeve SLE1 applied to the first synchronizer SL1 may be operated by an actuator (not shown) that may be controlled by a transmission control unit.

The second shifting output device OUT2 includes a second output shaft OS2, an idle shaft IDS, and a forward second speed shifting gear D2. The second output shaft OS2 is disposed in parallel with the first input shaft IS1, the idle shaft IDS is rotatably disposed on the second output shaft OS2, and the forward second speed shifting gear D2 is disposed on the idle shaft IDS and externally engaged with the third input gear G3 on the first input shaft IS1.

The forward second speed shifting gear D2 is fixedly disposed on the idle shaft IDS.

The second shifting output device OUT2 further includes a third clutch CL3 that is disposed between the second output shaft OS2 and the idle shaft IDS and selectively connects the forward second speed shifting gear D2 to the second output shaft OS2.

The torque shifted at the second shifting output device OUT2 is transmitted to a differential device DIFF through a second output gear OG2 fixed to an upstream portion of the second output shaft OS2.

The third clutch CL3 disposed between the second output shaft OS2 and the idle shaft IDS selectively transmits a torque from the idle shaft IDS to the second output shaft OS2.

The third clutch CL3 may be a multi-plate hydraulic pressure friction device that is frictionally engaged by hydraulic pressure.

A power transmission apparatus of a hybrid electric vehicle according to this example embodiment may enable various modes, for example, a fixed gear ratio mode that simulates a double clutch transmission, a variable gear ratio mode ("eCVT mode"), and electric vehicle mode ("EV mode").

2. Shift-Stages of the First Example Power Transmission Apparatus

Figure 2:
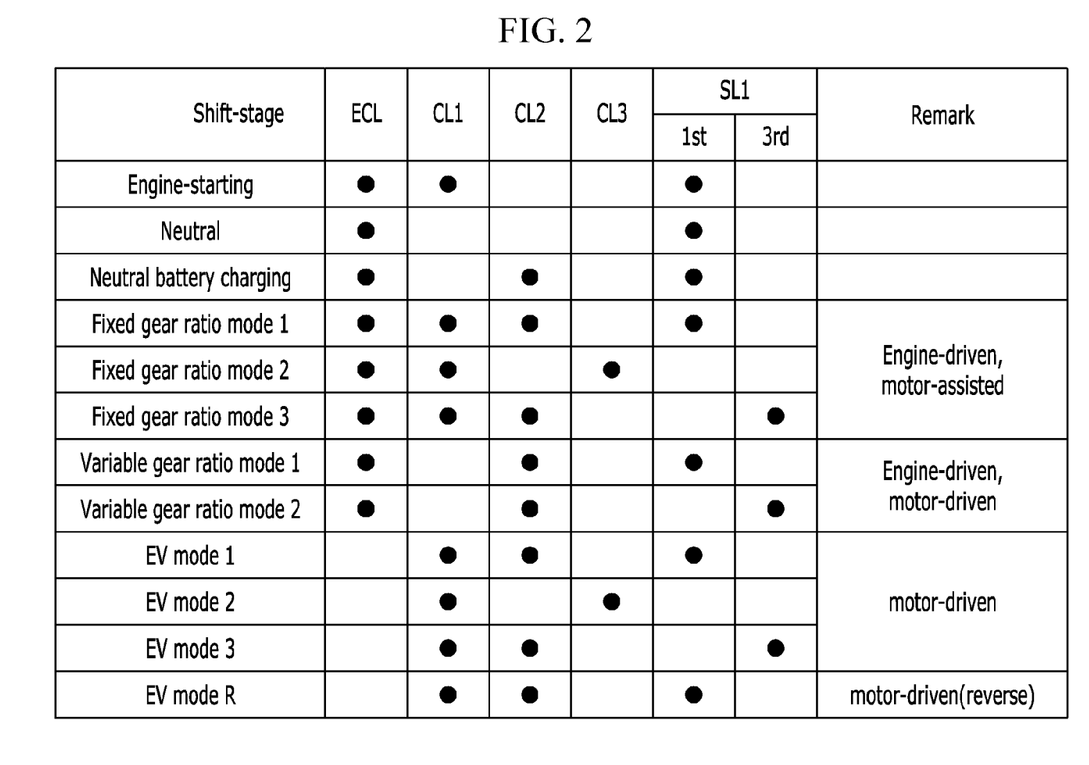
FIG. 2 is an operational chart for respective shift-stages of a power transmission apparatus of a hybrid electric vehicle according to a first example embodiment.

FIG. 2 is an operational chart for respective shift-stages of a power transmission apparatus of a hybrid electric vehicle according to a first example embodiment. Shifting operation of the power transmission apparatus is hereinafter described in detail with reference to FIG. 2.

a. Engine Starting Mode

In an engine starting mode, while the forward first speed shifting gear D1 is synchronized to the first output shaft OS1 by operating the first sleeve SLE1 of the first synchronizer SL1, the engine clutch ECL and the first clutch CL1 are operated.

Next, a driving torque of the motor/generator MG is transmitted to the engine ENG through the motor output shaft MOS, the first clutch CL1, the first input shaft IS1, the engine clutch ECL, and the engine output shaft EOS, and the engine ENG is started.

b. Neutral Mode

In a neutral mode, while the forward first speed shifting gear D1 is synchronized to the first output shaft OS1 by operating the first sleeve SLE1 of the first synchronizer SL1, the engine clutch ECL is operated.

In this case, although the torque of the engine ENG is supplied to the third rotational element N3 of the planetary gear set PG through the first input shaft IS1, the first rotational element N1 is freely rotatable. Thus, the second rotational element N2 does not output any driving torque and therefore a neutral position is enabled.

c. Neutral Position Battery Charging Mode

A neutral position battery charging mode is enabled while the engine ENG is started and running. While the forward first speed shifting gear D1 is synchronized to the first output shaft OS1 by operating the first sleeve SLE1 of the first synchronizer SL1, the engine clutch ECL and the second clutch CL2 are operated.

Next, the torque of the engine ENG is input to the third rotational element N3 of the planetary gear set PG through the first input shaft IS1, and the second rotational element N2 acts as a fixed element by being connected to the first output shaft OS1 due to the operation of the first synchronizer SL1.

In this case, the first rotational element N1 reversely rotates at a high speed, and drives the motor/generator MG through second clutch CL2 to generate electricity and thereby enable electric charging.

d. Fixed Gear Ratio Mode 1

In a fixed gear ratio mode, the engine ENG supplies a primary drive-torque and the motor/generator MG supplies an auxiliary drive-torque.

In a fixed gear ratio mode 1, the forward first speed shifting gear D1 is synchronized to the first output shaft OS1 by operating the first sleeve SLE1 of the first synchronizer SL1, and the engine clutch ECL and the first and second clutches CL1 and CL2 are operated.

This allows the torque of the engine ENG and a part of the torque of the motor/generator MG to be input to the third rotational element N3 of the planetary gear set PG, and a part of the torque of the motor/generator MG to be input to the first rotational element N1 of the planetary gear set PG through the second input shaft IS2.

Consequently, torques are simultaneously input to the first and third rotational elements N1 and N3 of the planetary gear set PG, and the planetary gear set PG integrally rotates, thereby outputting a same input torque to the third input shaft IS3 through the second rotational element N2.

Next, a shifted torque is transmitted to the first output shaft OS1 through the forward first speed shifting gear D1 externally engaged with the first input gear G1 on the third input shaft IS3, and transmitted to the differential DIFF through the first output gear OG1 on the first output shaft OS1.

e. Fixed Gear Ratio Mode 2

To transition to fixed gear ratio mode 2 from the fixed gear ratio mode 1, the synchronous connection of the forward first speed shifting gear D1 to the first output shaft OS1 is released by releasing the first sleeve SLE1 of the first synchronizer SL1, the second clutch CL2 is released, and the third clutch CL3 is operated.

This allows the torque of the engine ENG and a part of the torque of the motor/generator MG to be input to the third rotational element N3 of the planetary gear set PG through the first input shaft IS1.

Next, the torque is transmitted to the idle shaft IDS and the second output shaft OS2 through the forward second speed shifting gear D2 externally engaged with the third input gear G3 on the first input shaft IS1, and is transmitted to the differential DIFF through the second output gear OG2 of the second output shaft OS2.

In this case, the planetary gear set PG does not affect shifting of the power transmission apparatus because the first and second rotational elements N1 and N2 may freely rotate.

f. Fixed Gear Ratio Mode 3

To transition to fixed gear ratio mode 3 from fixed gear ratio mode 2, the forward third speed shifting gear D3 is synchronized to the first output shaft OS1 by operating the first sleeve SLE1 of the first synchronizer SL1, the third clutch CL3 is released, and the second clutch CL2 is operated.

This allows the torque of the engine ENG and a part of the torque of the motor/generator MG to be input to the third rotational element N3 of the planetary gear set PG, and a part of the torque of the motor/generator MG to bes input to the first rotational element N1 of the planetary gear set PG through the second input shaft IS2.

Consequently, torques are simultaneously input to the first and third rotational elements N1 and N3 of the planetary gear set PG, and the planetary gear set PG integrally rotates, thereby outputting a same input torque to the third input shaft IS3 through the second rotational element N2.

Next, a shifted torque is transmitted to the first output shaft OS1 through the forward third speed shifting gear D3 externally engaged with the second input gear G2 on the third input shaft IS3, and transmitted to the differential DIFF through the first output gear OG1 on the first output shaft OS1.

g. Variable Gear Ratio Mode 1

In a variable gear ratio mode, both torque of the motor/generator MG and the torque of the engine ENG are used as a driving power source.

Motor/generator MG may rotate at a different speed from the engine ENG, and in this case, the different speeds of the motor/generator MG and the engine ENG may be input to the planetary gear set PG such that the planetary gear may output a variable gear ratio thereby achieving an electronic continuously variable transmission ("eCVT") control.

That is, in a variable gear ratio mode 1, the forward first speed shifting gear D1 is synchronized to the first output shaft OS1 by operating the first sleeve SLE1 of the first synchronizer SL1, and the engine clutch ECL and the second clutch CL2 are operated.

In this case, by the operation of the engine clutch ECL, the torque of the engine ENG is input to the third rotational element N3 through the first input shaft IS1 of the planetary gear set PG, and by the operation of the second clutch CL2, the torque of the motor/generator MG is input to the first rotational element N1 through the second input shaft IS2.

Consequently, torques input to the first rotational element N1 and the third rotational element N3 react at the planetary gear set PG, and a shifted torque is output to the third input shaft IS3 through the second rotational element N2.

Next, the shifted torque is transmitted to the first output shaft OS1 through the forward first speed shifting gear D1 externally engaged with the first input gear G1 on the third input shaft IS3, and transmitted to the differential DIFF through the first output gear OG1 on the first output shaft OS1.

h. Variable Gear Ratio Mode 2

To transition to variable gear ratio mode 2 from variable gear ratio mode 1, the synchronous connection of the forward first speed shifting gear D1 to the first output shaft OS1 is released by operating the first sleeve SLE1 of the first synchronizer SL1, and the first output shaft OS1 and the forward third speed shifting gear D3 are connected.

Shifting from variable gear ratio mode 1 to variable gear ratio mode 2 is not directly performed, but instead achieved by intermediately operating the clutches CL1, CL2, and CL3 in a state of the fixed gear ratio mode 2, so as to prevent shift shock.

That is, the first, second, and third clutches CL1, CL2, and CL3 are operated from the state of the variable gear ratio mode 1 to the state of the fixed gear ratio mode 2. Subsequently, the synchronous connection of the first output shaft OS1 and the forward first speed shifting gear D1 is released by releasing the first synchronizer SL1, and the first output shaft OS1 and the forward third speed shifting gear D3 are synchronized by operating the first synchronizer SL1.

When the first output shaft OS1 and the forward third speed shifting gear D3 are synchronized, the operation of the first clutch CL1 and the third clutch CL3 are released, and the second clutch CL2 is operated.

In this case, the torque of the engine ENG is input to the third rotational element N3 of the planetary gear set PG through the first input shaft IS1 by the operation of the engine clutch ECL, and the torque of the motor/generator MG is input to the first rotational element N1 through the second input shaft IS2 by the operation of the second clutch CL2.

Consequently, torques input to the first rotational element N1 and the third rotational element N3 react at the planetary gear set PG, and a shifted torque is output to the third input shaft IS3 through the second rotational element N2.

Next, a shifted torque is transmitted to the first output shaft OS1 through the forward third speed shifting gear D3 externally engaged with the second input gear G2 on the third input shaft IS3, and transmitted to the differential DIFF through the first output gear OG1 on the first output shaft OS1.

i. EV Mode 1

In an electric vehicle mode ("EV mode"), the engine ENG is stopped, and only the torque of the motor/generator MG is used to drive a vehicle.

In an EV mode 1, the forward first speed shifting gear D1 is synchronized to the first output shaft OS1 by operating the first sleeve SLE1 of the first synchronizer SL1, and the first and second clutches CL1 and CL2 are operated.

This allows the torque of the motor/generator MG to be simultaneously input to the third rotational element N3 and the first rotational element N1 through the first input shaft IS1 and the second input shaft IS2.

Consequently, the torque of the motor/generator MG is simultaneously input to the first and third rotational elements N1 and N3 of the planetary gear set PG, and the planetary gear set PG integrally rotates, thereby outputting a same torque of the motor/generator MG to the third input shaft IS3 through the second rotational element N2.

Next, a shifted torque is transmitted to the first output shaft OS1 through the forward first speed shifting gear D1 externally engaged with the first input gear G1 on the third input shaft IS3, and transmitted to the differential DIFF through the first output gear OG1 on the first output shaft OS1.

In such an EV mode 1, a gear ratio of the first input gear G1 and the forward first speed shifting gear D1 is activated.

j. EV Mode 2

To transition to EV mode 2 from EV mode 1, the second clutch CL2 is released, the synchronous connection of the forward first speed shifting gear D1 to the first output shaft OS1 is released by releasing the first sleeve SLE1 of the first synchronizer SL1, and the third clutch CL3 is operated.

This allows the torque of the motor/generator MG to be input only to the first input shaft IS1.

Next, a shifted torque is transmitted to the second output shaft OS2 connected with the idle shaft IDS by the third clutch CL3 through the forward second speed shifting gear D2 externally engaged with the third input gear G3 on the first input shaft IS1, and is transmitted to the differential DIFF through the second output gear OG2 of the second output shaft OS2.

In this case, the planetary gear set PG does not affect to a shifting of the power transmission apparatus since the first and second rotational elements N1 and N2 may freely rotate.

k. EV Mode 3

To transition to EV mode 3 from the EV mode 2, the third clutch CL3 is released, the forward third speed shifting gear D3 is synchronized to the first output shaft OS1 by operating the first sleeve SLE1 of the first synchronizer SL1, and the second clutch CL2 is operated.

This allows the torque of the motor/generator MG to be simultaneously input to the third rotational element N3 and the first rotational element N1 through the first input shaft IS1 and the second input shaft IS2.

Consequently, the torque of the motor/generator MG is simultaneously input to the first and third rotational elements N1 and N3 of the planetary gear set PG, and the planetary gear set PG integrally rotates, thereby outputting a same torque of the motor/generator MG to the third input shaft IS3 through the second rotational element N2.

Next, a shifted torque is transmitted to the first output shaft OS1 through the forward third speed shifting gear D3 externally engaged with the second input gear G2 on the third input shaft IS3, and transmitted to the differential DIFF through the first output gear OG1 on the first output shaft OS1.

l. EV Mode R (Reverse Speed; Motor is Reversely Driven)

In an EV mode R, only a reverse torque of the motor/generator MG is used to drive a vehicle while the engine ENG is stopped.

In the EV mode R, while the engine ENG is stopped, the forward first speed shifting gear D1 is synchronized to the first output shaft OS1 by operating the first sleeve SLE1 of the first synchronizer SL1, and the first and second clutches CL1 and CL2 are operated.

This allows a reverse torque of the motor/generator MG to be simultaneously input to the third rotational element N3 and the first rotational element N1 through the first input shaft IS1 and the second input shaft IS2.

Consequently, the torque of the motor/generator MG is simultaneously input to the first and third rotational elements N1 and N3 of the planetary gear set PG, and the planetary gear set PG integrally rotates reversely, thereby outputting a same torque of the motor/generator MG to the third input shaft IS3 through the second rotational element N2.

Next, a shifted torque is transmitted to the first output shaft OS1 through the forward first speed shifting gear D1 externally engaged with the first input gear G1 on the third input shaft IS3, and transmitted to the differential DIFF through the first output gear OG1 on the first output shaft OS1.

Shifting operation has been described above with reference to an example of sequential upshifting, and it will be understood that shifting operation of sequential downshifting may be achieved by an opposite control.

In addition, the reverse speed has not been described in connection with the fixed gear ratio mode and the variable gear ratio mode, because a separate reverse speed shifting device is not included.

Thus, the reverse speed may be achieved only in the EV mode of a power transmission apparatus of a hybrid electric vehicle according to a first example embodiment.

3. Second Example Power Transmission Apparatus

Figure 3:
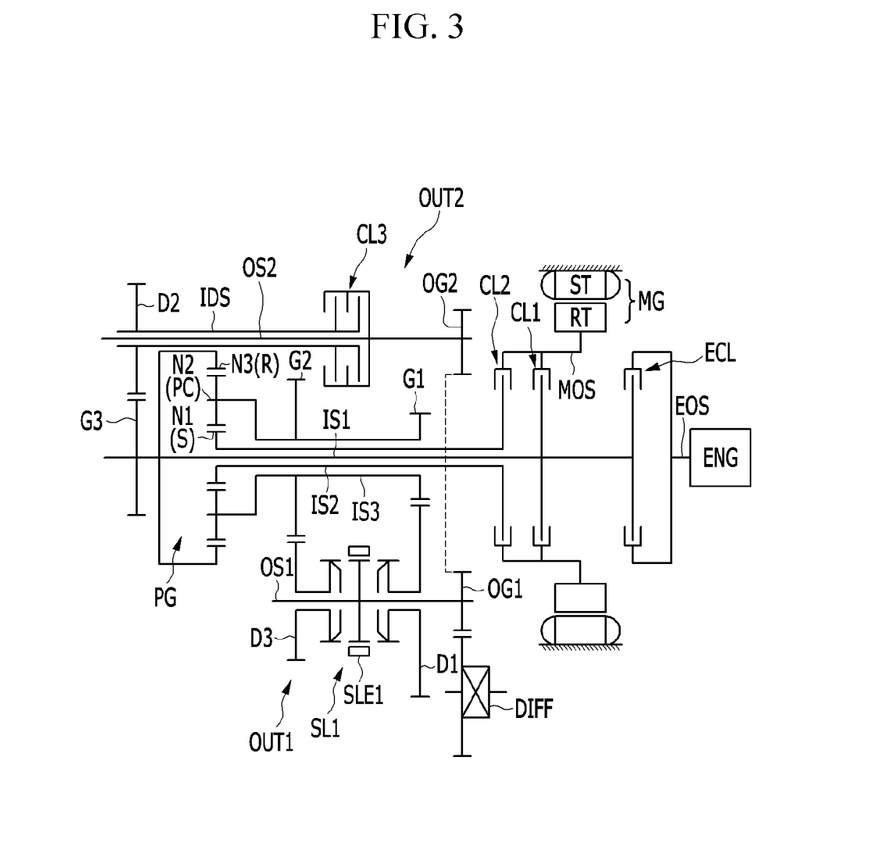
FIG. 3 is a schematic diagram of a power transmission apparatus of a hybrid electric vehicle according to a second example embodiment.

FIG. 3 is a schematic diagram of a power transmission apparatus of a hybrid electric vehicle according to a second example embodiment.

Referring to FIG. 3, the second example power transmission apparatus of a hybrid electric vehicle differs from the first example power transmission apparatus in that the third input gear G3 and the forward second speed shifting gear D2 externally engaged thereto are disposed at different locations.

In more detail, the third input gear G3 and the forward second speed shifting gear D2 are disposed rearward of the planetary gear set PG in the second example power transmission apparatus, whereas the third input gear G3 and the forward second speed shifting gear D2 are disposed forward of the planetary gear set PG in the first example power transmission apparatus.

Thus, the first and second example power transmission apparatuses differ only in the locations of the third input gear G3 and the forward second speed shifting gear D2. Other arrangements and shifting operations are the same for both the first and second example power transmission apparatuses.

As described above, a power transmission apparatus for a hybrid electric vehicle shows an effective improvement of fuel consumption by providing three shift-stages in a fixed gear ratio mode by using the engine ENG as a primary power source and the motor/generator MG as an auxiliary power source, two shift-stages in a variable gear ratio mode enabling electronic continuously variable shifting by using the engine ENG and the motor/generator MG as power sources, and three shift-stages by only using the motor/generator as a power source.

In particular, driving efficiency may be enhanced by operating a power transmission apparatus in the variable gear ratio mode for city driving, and in the fixed gear ratio mode for high speed driving.

In addition, smooth starting of a vehicle may be achieved by the engine ENG and the motor/generator connected with respective rotational elements of the planetary gear set.

When the motor/generator fails, a vehicle may be driven by the torque of the engine ENG.

In the fixed gear ratio mode, the torque of the motor/generator may be used as an auxiliary power source, thereby improving an acceleration performance.

The reverse speed driving may be achieved by reversely driving the motor/generator MG.

While this disclosure has been described in connection with practical example embodiments, it is to be understood that the disclosure is not limited to the disclosed embodiments, but, on the contrary, is intended to cover various modifications and equivalent arrangements included within the spirit and scope of the appended claims.

5. Description of Symbols

ENG: engine
CL1, CL2, CL3: first, second, and third clutches
ECL: engine clutch
D1, D2, D3: first, second, and third speed shifting gears
EOS: engine output shaft
G1, G2, G3: first, second, and third input gears
MG: motor/generator
MOS: motor output shaft
IS1, IS2, IS3: first, second, and third input shafts
OS1, OS2: first and second output shafts
OUT1, OUT2: first and second shifting output devices
PG: planetary gear set
SL1: first synchronizer

What is claimed is:

1. A power transmission apparatus for a hybrid vehicle having an engine and a motor/generator as power sources, comprising:
    an input unit including a first input shaft selectively connected with the engine and the motor/generator and fixedly disposed with one input gear, a second input shaft selectively connected with the motor/generator, and a third input shaft fixedly disposed with at least one input gear;
    a torque converting unit including a planetary gear set having a first rotational element connected with the second input shaft, a second rotational element connected with the third input shaft, and a third rotational element connected with the first input shaft; and
    a shifting output unit for shifting torques received from the first and third input shafts and outputting a shifted torque.

2. The power transmission apparatus of claim 1, wherein:
    the second and third input shafts of the input unit are hollow; and
    the first, second, and third input shafts are coaxially disposed in a radial direction in an order of the first, second, and third input shafts.

3. The power transmission apparatus of claim 1, wherein the torque converting unit is disposed at a downstream portion of the first, second, and third input shafts.

4. The power transmission apparatus of claim 1, wherein the torque converting unit is a single pinion planetary gear set having a sun gear as the first rotational element, a planet carrier as the second rotational element, and a ring gear as the third rotational element.

5. The power transmission apparatus of claim 1, wherein the shifting output unit comprises:
    a first shifting output device including a first output shaft disposed in parallel with the first input shaft, two shifting gears rotatably disposed on the first output shaft and externally engaged with two input gears fixedly formed on the third input shaft, and a first output gear fixedly disposed at an upstream portion of the first output shaft; and
    a second shifting output device including a second output shaft disposed in parallel with the first input shaft, an idle shaft rotatably disposed on the second output shaft, one shifting gear fixedly disposed on the idle shaft, selectively connected with the second output shaft, and externally engaged with the one input gear fixedly disposed on the first input shaft, and a second output gear fixedly disposed at an upstream portion of the second output shaft.

6. The power transmission apparatus of claim 5, wherein the one input gear and the one shifting gear externally engaged with the one input gear are disposed forward of the planetary gear set.

7. The power transmission apparatus of claim 5, wherein the one input gear and the one shifting gear externally engaged with the one input gear are disposed rearward of the planetary gear set.

8. The power transmission apparatus of claim 1, wherein:
    the at least one input gear fixedly disposed on the third input shaft comprises a first input gear acting as an input gear for the forward first speed and a second input gear acting as an input gear for the forward third speed; and
    the one input gear fixedly disposed on the first input shaft is a third input gear acting as an input gear for the forward second speed.

9. A power transmission apparatus for a hybrid vehicle having an engine and a motor/generator as power sources, comprising:
    an input unit including a first input shaft selectively connected with the engine and the motor/generator and fixedly disposed with a first input gear, a second input shaft rotatably disposed exterior to the first input shaft and selectively connected with the motor/generator, and a third input shaft rotatably disposed exterior to the second input shaft and fixedly disposed with first and second input gears;
    a torque converting unit including a planetary gear set having a sun gear connected with the second input shaft, a ring gear connected with the first input shaft, and a planet carrier connected with the third input shaft; and
    a shifting output unit for shifting torques received from the first and third input shafts and outputting a shifted torque.

10. The power transmission apparatus of claim 9, wherein the second and third input shafts are hollow.

11. The power transmission apparatus of claim 9, wherein the torque converting unit is disposed at a downstream portion of the first, second, and third input shafts.

12. The power transmission apparatus of claim 9, wherein:
the third input gear acts as an input gear for the forward first speed;
the second input gear acts as an input gear for the forward third speed; and
the first input gear acts as an input gear for the forward second speed.

13. The power transmission apparatus of claim 9, wherein the shifting output unit comprises:
a first shifting output device including a first output shaft disposed in parallel with the first input shaft, forward first and third speed shifting gears rotatably disposed on the first output shaft and externally engaged with the second and third input gears fixedly formed on the third input shaft, and a first output gear fixedly disposed at an upstream portion of the first output shaft; and
a second shifting output device including a second output shaft disposed in parallel with the first input shaft, an idle shaft rotatably disposed on the second output shaft, a forward second speed shifting gear fixedly disposed on the idle shaft, selectively connected with the second output shaft, and externally engaged with the first input gear fixedly disposed on the first input shaft, and a second output gear fixedly disposed at an upstream portion of the second output shaft.

14. The power transmission apparatus of claim 13, wherein the first input gear and the forward second speed shifting gear externally engaged with the first input gear are disposed forward of the planetary gear set.

15. The power transmission apparatus of claim 13, wherein the first input gear and the forward second speed shifting gear externally engaged with the first input gear are disposed rearward of the planetary gear set.

* * * * *